Patented Aug. 6, 1940

2,210,693

UNITED STATES PATENT OFFICE 2,210,693

OUT-OF-STEP BLOCKING RELAY

Harold R. Vaughan, Richmond Heights, Mo., assignor to Westinghouse Electric & Manufacturing Company, East Pittsburgh, Pa., a corporation of Pennsylvania Application March 18, 1939, Serial No. 262,653

9 Claims. (Cl. 175—294)

My invention relates to fault-responsive protective relaying systems for a polyphase line, and it has particular relation to such systems in which provision is made for out-of-synchronism conditions.

When two interconnected power systems pull out of step, the relative values of voltages and currents are such as to indicate a three-phase fault somewhere in the interconnection. If this three-phase fault-indication is in the zone of high-speed impedance relays, it will cause them to trip their associated oil circuit-breakers, or, in general, to effect a line-sectionalizing operation. Indiscriminate opening of circuit-breakers, in an interconnection line, during out-of-synchronism conditions, is objectionable, in general, because of insufficient generator-capacity on the power-system at one side of the break, and also because of loss of power to any load which is connected between two or more such breaks or sectionalizing points which may become opened in different line-sections during out-of-synchronism conditions.

Although this phenomenon has been recognized for some time, and various blocking schemes have been proposed and utilized, for preventing unwanted circuit-interrupting operations during out-of-synchronism conditions, it has been generally accepted that, when high-speed relays are involved, as in all modern relaying systems where out-of-synchronism conditions present any problem at all, it is necessary to utilize carrier-current or pilot-wire protective means for giving a simultaneous control of the relays at both ends of a protected line-section, in order to discriminate between a fault and an out-of-synchronism condition.

My present invention is directed to a simple and reliable means whereby tripping during out-of-synchronism conditions may be prevented, with no delay or interruption in the normal fault-responsive tripping functions, except a loss of the second-zone back-up protective means in the case of an approximately symmetrical polyphase fault.

Figure 1:
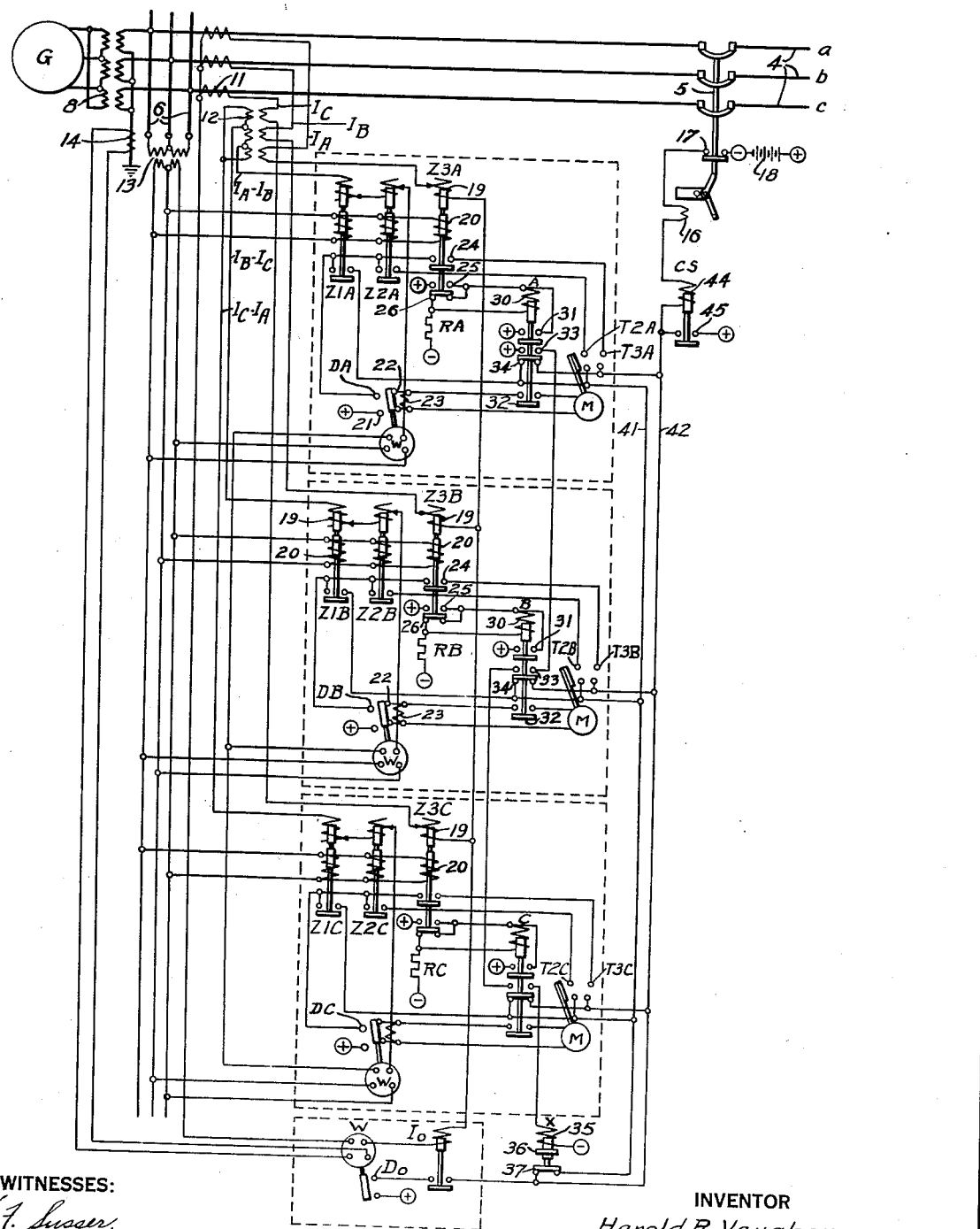
Figure 2:
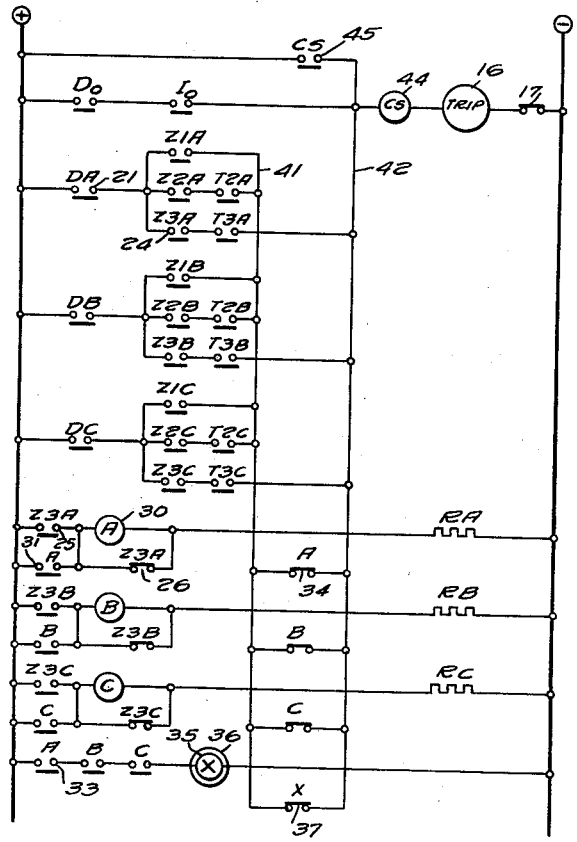

With the foregoing and other objects in view, my invention consists in the combinations, systems, methods, circuits and apparatus hereinafter described and claimed, and illustrated in the accompanying drawings, wherein:

Figure 1 is a simplified diagrammatic view of circuits and apparatus illustrating my invention in a preferred form of embodiment, with the electromagnetic relays illustrated in their deenergized positions, features which are unnecessary to an understanding of my invention being omitted for the sake of clearness; and Fig. 2 is a so-called "across-the-line" diagram of the direct-current connections of said relaying system.

In Figure 1, I illustrate my invention as being applied to the protection of one end of a three-phase transmission line-section 4, the three phase-conductors being distinguished by the letters $a$, $b$, and $c$. The line-section 4 is connected, through a circuit-breaker 5, to a bus 6, which is energized, through delta-star step-up transformers 8, from a generator or generators G. Energy for the various relaying apparatus is obtained by means of a bank of line-current transformers 11 which produce the relaying currents $I_A$, $I_B$ and $I_C$, corresponding to the three line-phases; a bank of auxiliary current transformers 12 which produce the relaying currents $(I_A - I_B)$, $(I_B - I_C)$ and $(I_C - I_A)$; a bank of potential transformers 13 for supplying the relaying voltages; and an auxiliary current-transformer 14 connected in the grounded neutral of the line-connected star-side of the power transformers 8, for obtaining a convenient source of reference-current for determining the direction of the residual line-currents, as will be subsequently described.

The circuit-breaker 5 is provided with a trip coil 16 which is energized, in accordance with my protective relaying means, through an auxiliary circuit-breaker contact 17, and a direct-current source symbolized by a battery 18, the terminals of which are indicated by (+) and (—).

My invention is illustrated as being applied to a relaying system utilizing three phase-fault relays in each phase, said relays being of increasing sensitivities corresponding to what is known as "first-zone," "second-zone," and "third-zone" operation, the different zones being indicated by the numerals 1, 2 and 3, and the different phases being distinguished by the letters A, B and C, so that the nine quick-acting non-directional impedance relays are designated Z1A, Z2A, Z3A, Z1B, Z2B, Z3B, Z1C, Z2C and Z3C. Each impedance-relay element consists of a current-responsive operating coil 19 and a voltage-responsive restraining coil 20, suitably energized, in any desired manner, so as to be responsive to the line-impedance. The particular manner of energization, illustrated in the drawings, is a slight modification of that which is shown in a Harder Patent No. 2,144,494, granted January 17, 1939, and assigned to the Westinghouse Electric & Manufacturing Company. I wish it to be understood, however, that any desired phase-current line-impedance response may be utilized.

A group of three impedance relays for each of the line-phases is associated with a quick-acting directional relay element which is indicated schematically in the drawings as a simple wattmeter element W. Each directional element W is provided with a make-contact 21 and a break-contact 22, the make-contacts for the different phases being utilized as the directional relay elements DA, DB and DC, respectively.

Each group of phase-fault relays is provided with a timing motor M, which may be of the resetting type shown in the Goldsborough Patent No. 1,934,665, granted November 7, 1933, and assigned to the Westinghouse Electric & Manufacturing Company. The timing motors M have second-zone and third-zone timer contacts T2A, T3A, T2B, T3B, T2C, T3C. The timer motors M are illustrated as being energized by auxiliary current-transformers 23, from the currents $(I_A-I_B)$, $(I_B-I_C)$ and $(I_C-I_A)$ respectively. The current-transformers 23 are normally short-circuited, respectively, by the back contacts 22 of the respective directional elements W. The second-zone timer-contacts T2A, T2B and T2C are designed to provide a time delay which is sufficient, in general, for the completion of a circuit-interrupting operation by a first-zone relaying means at a point closer to the fault, and the third-zone timer contacts T3A, T3B and T3C are arranged to provide a time-delay which is sufficient, in general, for the completion of a circuit-interrupting operation by a second-zone relaying-means at a point closer to the fault.

The third zone impedance elements Z3A, Z3B and Z3C are each provided with two make-contacts 24 and 25, and a break-contact 26. In order to avoid the necessity for further multiplication of the contacts on the third-zone impedance elements, the contacts 25 are utilized to energize the operating coil 30 of corresponding auxiliary relays A, B and C, through a resistor RA, RB and RC respectively. Each of the relays A, B and C is operative to seal itself in, when energized, by means of a holding circuit through a make-contact 31, the relay A, B or C being released again, upon the deenergization of the corresponding third-zone impedance element Z3A, Z3B or Z3C, by the closure of the back-contact 26, which short-circuits the auxiliary relay coil 30.

Each of the auxiliary relays A, B and C has, in addition to the make-contact 31, two other make-contacts 32 and 33, and a break-contact 34. The make-contact 32 is utilized to control the energization of the timing motor M.

In accordance with my invention, the make-contacts 33 of the three auxiliary relays A, B and C are connected in series with each other, and are utilized to energize the operating coil 35 of a slowly operating relay X, which is illustrated as having a slug or short-circuited loop or winding 36 on it, for causing a slight delay, of the order of 5 cycles, in its operation. This relay X is provided with a single back-contact 37.

It is a significant feature of my invention that the operating coil 35 of the retarded relay X is under the sole control of the three serially connected contacts 33 of the relays A, B and C, without any interlock with a receiver relay or other pilot-channel relay, as has heretofore been considered necessary. This omission of the receiver-relay response is made possible by an alteration in the circuit-connections involving the back-contact 37 of the retarded relay X and the three back-contacts 34 of the auxiliary relays A, B and C. These four back contacts 37 and 34 are all connected, in parallel with each other, between an intermediate relaying circuit 41 and a trip-circuit 42, and in accordance with my invention, the intermediate circuit 41 is connected so as to be energized instantaneously in response to the operation of any one of the directional elements DA, DB or DC and its corresponding first-zone impedance element Z1A, Z1B or Z1C, and so as to be energized, with a time-delay, in response to the operation of any one of the directional elements DA, DB or DC and its corresponding second-zone impedance-elements and timer-contacts Z2B—T2A, Z2B—T2B or Z2C—T2C.

In accordance with my invention, the so-called "back-up" protection, if used, which is provided by the operation of any one of the directional elements DA, DB or DC and the third-zone impedance elements and timer contacts Z3A—T3A, Z3B—T3B or Z3C—T3C, is connected so as to directly energize the tripping circuit 42, instead of being connected to the auxiliary circuit 41 which is subject to a blocking of the tripping operation, by the opening of all four of the back-contacts 34 and 37 of the relays A, B, C and X.

In the illustrated embodiment of my invention, I have indicated the protective system as also including ground-fault protection in the form of an overcurrent ground-relay $I_0$ which is energized in accordance with the neutral current of the line-current transformers 11, and a ground directional relay $D_0$, which is energized so as to compare the directions of the neutral current of the line-current transformers 11 and the neutral current of the power-transformers 8, as furnished by the auxiliary transformer 14. Where this ground-fault protection is utilized, the contacts of the ground overcurrent and directional relays $I_0$ and $D_0$ are connected in series with each other so as to directly energize the tripping circuit 42.

As is customary in trip-circuit arrangements, I have also illustrated my system as including a contactor switch CS having an operating coil 44 and a make-contact 45. The operating coil is connected between the trip-circuit bus 42 and the trip coil 16 of the circuit-breaker 5, the circuit of which is completed through the auxiliary circuit-breaker contact 17, as is customary. The make-contact 45 of the CS relay is utilized to directly energize the trip circuit 42.

The operation of my invention is as follows.

An out-of-synchronism condition will result, in general, in the actuation of all three of the sensitive, or third-zone, impedance elements Z3A, Z3B and Z3C, at some time or times during the out-of-synchronism cycle or cycles. I refer to the line-conditions which result in the actuation of the corresponding impedance elements in all three phases, as line-conditions corresponding to an approximately symmetrical polyphase fault, by which expression I mean that the fault-indication is sufficiently symmetrical to actuate the corresponding impedance elements of all three phases of the line. It will be noted that the impedance relay-elements are all non-directional in their responses, so that the operation of my out-of-synchronism response is not made contingent upon any directional response, such as the directional elements DA, DB or DC, which cannot be relied upon to close promptly during out-of-synchronism conditions, and is also not contingent upon a receiver-relay contact such as is shown at 58 in the Harder Patent 2,144,494, which necessitates costly carrier-current equipment, and which also involves directional responses in the control of the carrier-current equipment.

A significant feature about the progress of an out-of-synchronism cycle is that, while the same polyphase line-current exists at all of the relaying points in the affected line, the phases of the line-voltages, at the various relaying points along the line, undergo an alteration, as the voltages at one end of the line advance through 360° with respect to the voltages at the other end of the line. At the same time, the magnitudes of the line-voltages, at the different relaying points along the line, suffer a change, diminishing to a minimum at approximately the 180° point of the out-of-synchronism cycle, and then being restored again as the two ends of the line reapproach synchronism after having slipped a pole. The severity of this voltage-dip, at about the mid-point of the out-of-synchronism cycle, depends upon the location of the relaying point, the voltage becoming the least at the so-called electrical center of the interconnection between the generating systems which are falling out of synchronism with each other. The foregoing phenomena are relatively slow in their progress, requiring something like a second, or 60 cycles in an ordinary 60-cycle system, more or less, to complete a 360° slip-cycle, the duration of the slip-cycle being dependent upon the particular system operating condition.

It will be apparent, from the foregoing very brief explanation, that the most sensitive, or third-zone, impedance elements Z3A, Z3B and Z3C, will be the first impedance elements to be actuated, at any given relaying location, during the progress of an out-of-synchronism cycle. There will inevitably be a certain amount of delay, after the operation of the third-zone impedance elements, before either the first-zone or second-zone impedance elements will be actuated, during the progress of an out-of-step cycle, if these first-zone and second-zone impedance elements are operated at all during the out-of-synchronism cycle. In most transmission systems, this delay, after the operation of the third-zone impedance elements, will be longer than five cycles or $\frac{1}{12}$ of a second.

In accordance with my invention, I design the delayed action relay X so as to provide a sufficient time-hesitation or slight delay, so as to make sure that the instantaneous tripping circuits DA—Z1A, DB—Z1B or DC—Z1C shall have had ample time for closure, before the retarded relay contact 37 is opened, so that the retarded relay X does not prevent instantaneous, or first-zone, tripping in response to any phase-fault, whether symmetrical or unsymmetrical. At the same time, the duration of the time-delay which is introduced by the retarded action of the auxiliary relay X must not be longer than the time-delay which is provided by the second-zone timer-contacts T2A, T2B or T2C, as the case may be, plus the minimum expectable time-delay in the picking up of any second-zone impedance element, after the actuation of all three of the third-zone impedance elements, during any out of synchronism cycle. It is also necessary for the time delay which is introduced by the retarded auxiliary relay X to be less than the minimum expectable time-delay in the actuation of any first-zone impedance element Z1A, Z1B or Z1C after the actuation of the third-zone impedance elements during the progress of any out-of-synchronism cycle.

As a result of the foregoing arrangements and operations, a normal first-zone or quick-acting tripping operation occurs as to any first-zone faults which occur prior to the X-relay delay, of say 5 cycles, after the actuation of all three of the third-zone impedance elements, during some portion of the out-of-synchronism cycle. After the expiration of the X-relay time-delay, the X-relay contact 37 opens, and this opening operation interrupts the trip-circuit connection between the buses 41 and 42, since the back contacts 34 of the auxiliary relays A, B and C would be open already, operating substantially instantaneously as soon as the respective third-zone impedance elements Z3A, Z3B and Z3C pick up.

From this time on, tripping operations are blocked by the auxiliary relay contact 37, and the tripping remains blocked until the third-zone impedance elements Z3A, Z3B and Z3C drop out again, at some time during the second half of the out-of-synchronism cycle. The first one of these third-zone impedance elements to drop out deenergizes its corresponding auxiliary relay A, B or C, which closes its back contact 34, and makes it possible for a tripping operation to occur, if the auxiliary bus 41 is at that moment energized as a result of either an instantaneous first-zone circuit such as DA—Z1A, or a delayed second-zone circuit such as DA—Z2A—T2A. It will be understood that the first- and second-zone impedance elements, if they are actuated at all, during the out-of-synchronism cycle, will become actuated after the third-zone impedance elements are actuated, and they will drop out again, after the mid-point of the out-of-synchronism cycle, before the third-zone impedance elements drop out again.

In practicing my invention, when the third-zone timer or "back-up" protection is utilized, it will be necessary for the third-zone timer contacts T3A, T3B and T3C to have a longer setting than the maximum expectable duration of the actuation of the third-zone impedance elements during any out-of-synchronism cycle, so that this third-zone or back-up fault protection will not be operated during the out-of-synchronism condition. It will further be noted that the out-of-synchronism blocking, which is afforded by the four back-contacts 34 and 37 of the relays A, B, C and X, is not effective against the third-zone or back-up tripping-circuit such as DA—Z3A—T3A, so that said back-up protection will be available for any faults not involving all three phases of the protected line-section.

Since my out-of-synchronism-responsive relaying-means is absolutely non-directional in its operation, it will be apparent that a single out-of-synchronism relaying mechanism, comprising the four auxiliary relays A, B, C and X, with their contacts 34 and 37, or duplicates of said contacts, may be utilized to suffice for an extension of the line 4 on the other side of the bus 6, in the case of relaying stations which are located at some intermediate point in the interconnection line 4. It is not necessary to duplicate the out-of-synchronism equipment for the line-sections on both sides of the station bus 6.

While I have illustrated my invention in a preferred form of embodiment, it will be obvious that many changes, such as those which have been suggested during the course of the description, and other changes not alluded to, may be made by those skilled in the art, without departing from the essential features of my invention.

I desire, therefore, that the appended claims shall be accorded the broadest construction consistent with their language and the prior art.

I claim as my invention:

1. A fault-responsive protective relaying system for a polyphase line, with provision for out-of-synchronism conditions, comprising a quick-acting directional impedance-responsive relaying-means for promptly effecting a line-sectionalizing operation in response to line-faults, a sensitive polyphase-fault impedance-responsive relaying-means, sensitive to more distant line-faults than said first-mentioned relaying means but responsive only to approximately symmetrical polyphase fault-conditions, and means operative, after a time-delay, in accordance with a predetermined response to line-conditions at the relaying station independently of line-conditions at any other station, said last-mentioned means involving a response to said sensitive relaying-means and operating to interpose an impediment against the consummation of a tripping operation by said first-mentioned relaying-means.

2. A fault-responsive protective relaying system for a polyphase line, with provision for out-of-synchronism conditions, comprising a first-zone quick-acting directional impedance-responsive relaying-means for promptly effecting a line-sectionalizing operation in response to line-faults, a second-zone time-delayed directional impedance-responsive relaying-means, sensitive to more distant line-faults than the first-zone relaying-means, for effecting a line-sectionalizing operation after a time-delay sufficient, in general, for the completion of a circuit-interrupting operation by a first-zone relaying-means at a point closer to the fault, a sensitive polyphase-fault impedance-responsive relaying-means, sensitive to more distant line-faults than the second-zone relaying-means but responsive only to approximately symmetrical polyphase fault-conditions, and means operative, after a brief time-delay, in accordance with a predetermined response to line-conditions at the relaying station independently of line-conditions at any other station, said last-mentioned means involving a response to said sensitive polyphase-fault relaying-means and operating to interpose an impediment against the consummation of a tripping operation by said first-zone and second-zone relaying-means.

3. A fault-responsive protective relaying system for a polyphase line, with provision for out-of-synchronism conditions, comprising a first-zone quick-acting directional impedance-responsive relaying-means for promptly effecting a line-sectionalizing operation in response to line-faults, a second-zone time-delayed directional impedance-responsive relaying-means, sensitive to more distant line-faults than the first-zone relaying-means, for effecting a line-sectionalizing operation after a time-delay sufficient, in general, for the completion of a circuit-interrupting operation by a first-zone relaying-means at a point closer to the fault, a sensitive polyphase-fault impedance-responsive relaying-means sensitive to more distant line-faults than the second-zone relaying-means but responsive only to approximately symmetrical polyphase fault-conditions, means operative, after a brief time-delay, in accordance with a predetermined response to line-conditions at the relaying station independently of line-conditions at any other station, said last-mentioned means involving a response to said sensitive polyphase-fault relaying-means and operating to interpose an impediment against the consummation of a tripping operation by said first-zone and second-zone relaying-means, and a third-zone time-delayed directional impedance-responsive relaying means, sensitive to more distant line-faults than the second-zone relaying-means, for effecting a line-sectionalizing after a still longer time-delay which is longer, in general, than the longest expectable time required for the first release of the non-directional relaying-means during any expectable out-of-synchronism condition.

4. A fault-responsive protective relaying system for a polyphase line, with provision for out-of-synchronism conditions, comprising a quick-acting directional impedance-responsive relaying-means for promptly effecting a line-sectionalizing operation in response to line-faults, and a sensitive non-directional polyphase-fault impedance-responsive relaying-means, sensitive to more distant line-faults than said directional relaying-means but responsive only to approximately symmetrical polyphase fault-conditions, operative, after a time-delay, to interpose an impediment against the consummation of a tripping operation by said directional relaying-means.

5. A fault-responsive protective relaying system for a polyphase line, with provision for out-of-synchronism conditions, comprising a first-zone quick-acting directional impedance-responsive relaying-means for promptly effecting a line-sectionalizing operation in response to line-faults, a second-zone time-delayed directional impedance-responsive relaying-means, sensitive to more distant line-faults than the first-zone relaying-means, for effecting a line-sectionalizing operation after a time-delay sufficient, in general, for the completion of a circuit-interrupting operation by a first-zone relaying-means at a point closer to the fault, and a sensitive non-directional polyphase-fault impedance-responsive relaying-means, sensitive to more distant line-faults than the second-zone relaying-means but responsive only to approximately symmetrical polyphase fault-conditions, operative, after a brief time-delay, to interpose an impediment against the consummation of a tripping operation by said first-zone and second-zone relaying means.

6. A fault-responsive protective relaying system for a polyphase line, with provision for out-of-synchronism conditions, comprising a first-zone quick-acting directional impedance-responsive relaying-means for promptly effecting a line-sectionalizing operation in response to line-faults, a second-zone time-delayed directional impedance-responsive relaying-means, sensitive to more distant line-faults than the first-zone relaying-means, for effecting a line-sectionalizing operation after a time-delay sufficient, in general, for the completion of a circuit-interrupting operation by a first-zone relaying-means at a point closer to the fault, a sensitive non-directional polyphase-fault impedance-responsive relaying-means sensitive to more distant line-faults than the second-zone relaying-means but responsive only to approximately symmetrical polyphase fault-conditions, operative, after a brief time-delay, to interpose an impediment against the consummation of a tripping operation by said first-zone and second-zone relaying-means, and a third-zone time-delayed directional impedance-responsive relaying-means, sensitive to more distant line-faults than the second-zone relaying-means, for effecting a line-sectionalizing after a still longer time-delay which is longer, in general, than the longest expectable time required for the first release of the non-directional relaying-means during any expectable out-of-synchronism condition.

7. A fault-responsive protective relaying system for a polyphase line, with provision for out-of-synchronism conditions, comprising a tripping-means including a quick-acting fault-responsive relaying-means for promptly effecting a line-sectionalizing operation in response to line-faults, a sensitive fault-responsive relaying-means, sensitive to more distant line-faults than said first-mentioned relaying-means, and means operative, after a time-delay, in accordance with a predetermined response to line-conditions at the relaying station independently of line-conditions at any other station, said last-mentioned means involving a response to said sensitive relaying-means and operating to interpose an impediment against the consummation of a tripping operation by said first-mentioned relaying-means, said time-delay being long enough, in general, to have permitted the response of said first-mentioned relaying-means if there had been a fault, but not long enough, in general, to include the sequential operation of the two relaying-means during out-of-synchronism conditions.

8. A fault-responsive protective relaying-system for a polyphase line, with provision for out-of-synchronism conditions, comprising tripping-means including a quick-acting fault-responsive relaying-means for promptly effecting a line-sectionalizing operation in response to line-faults, a sensitive polyphase fault-responsive relaying-means, sensitive to more distant line-faults than said first-mentioned relaying-means but responsive only to approximately symmetrical polyphase fault-conditions, and means operative, after a time-delay, in accordance with a predetermined response to line-conditions at the relaying station independently of line-conditions at any other station, said last-mentioned means involving a response to said sensitive relaying-means and operating to interpose an impediment against the consummation of a tripping operation by said first-mentioned relaying-means, said time-delay being long enough, in general, to have permitted the response of said first-mentioned relaying-means if there had been a fault, but not long enough, in general, to include the sequential operation of the two relaying-means during out-of-synchronism conditions.

9. A fault-responsive protective relaying system for a polyphase line, with provision for out-of-synchronism conditions, comprising a quick-acting directional fault-responsive relaying-means for promptly effecting a line-sectionalizing operation in response to line-faults, and a sensitive non-directional polyphase fault-responsive relaying-means, sensitive to more distant line-faults than said directional relaying-means but responsive only to approximately symmetrical polyphase fault-conditions, operative, after a time-delay, to interpose an impediment against the consummation of a tripping operation of said directional relaying-means, said time-delay being long enough, in general, to have permitted the response of said first-mentioned relaying-means if there had been a fault, but not long enough, in general, to include the sequential operation of the two relaying-means during out-of-synchronism conditions.

HAROLD R. VAUGHAN.